US008665391B2

(12) United States Patent
Li

(10) Patent No.: US 8,665,391 B2
(45) Date of Patent: Mar. 4, 2014

(54) LIQUID CRYSTAL DISPLAY DEVICE AND ITS CASE

(75) Inventor: Quan Li, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 163 days.

(21) Appl. No.: 13/395,874

(22) PCT Filed: Dec. 20, 2011

(86) PCT No.: PCT/CN2011/084287
§ 371 (c)(1),
(2), (4) Date: Mar. 13, 2012

(87) PCT Pub. No.: WO2013/078738
PCT Pub. Date: Jun. 6, 2013

(65) Prior Publication Data
US 2013/0155346 A1 Jun. 20, 2013

(30) Foreign Application Priority Data

Dec. 2, 2011 (CN) .......................... 2011 1 0396027

(51) Int. Cl.
*G02F 1/1333* (2006.01)
*H02B 1/015* (2006.01)
(52) U.S. Cl.
USPC ........................................... 349/58; 361/644
(58) Field of Classification Search
USPC ........................................... 349/58; 361/644
See application file for complete search history.

(56) References Cited

U.S. PATENT DOCUMENTS

2010/0060116 A1 * 3/2010 Okano et al. ............... 312/223.1

FOREIGN PATENT DOCUMENTS

| CN | 2679499 Y | 2/2005 | |
|----|-----------|--------|--|
| CN | 201218444 Y | 4/2009 | |
| CN | 101566745 A | 10/2009 | |
| CN | 101832496 A | 9/2010 | |
| CN | 201780427 U | 3/2011 | |
| CN | 202026415 U | * 11/2011 | ............... H04N 5/64 |
| CN | 202026415 U | 11/2011 | |
| TW | M342524 U | 10/2008 | |

* cited by examiner

*Primary Examiner* — Mike Qi
(74) *Attorney, Agent, or Firm* — Muncy, Geissler, Olds & Lowe, P.C.

(57) ABSTRACT

An LCD device and its case, the case includes a front frame and a back cover cooperating with each other and a fastener for assembling them together, and side walls of them are overlapped and holes are disposed in the side walls correspondingly. It further includes a connector member, the connector member includes a fixing portion closely fitted with a bottom wall of the back cover; a connecting portion closely fitted with the side wall of the front frame; a stopping portion inserted into the holes in the side walls of the front frame and the back cover correspondingly; an installation pole is disposed on the bottom wall of the back cover, the fixing portion of the connector member has an installation hole corresponding to the installation pole, the fastener goes through the installation hole and is fastened in the installation pole, and thus the connector member is fixed.

18 Claims, 2 Drawing Sheets

LIQUID CRYSTAL DISPLAY DEVICE AND ITS CASE

FIELD OF THE INVENTION

The present invention relates to a liquid crystal display device and more particularly to a case structure of the liquid crystal display device.

BACKGROUND OF THE INVENTION

People are changing their standard of style for display devices. For example, in the television industry, consumers are demanding liquid crystal display devices with slim and narrow frames, which have become a requirement of stylish design. On the other hand, in order to meet the requirement of large sized splicing liquid crystal screen, liquid crystal display device as an essential module for composing large sized splicing liquid crystal screen, its width of frame is required to be as narrow as possible, so that seamless splicing can be achieved as much as possible between liquid crystal display modules.

A structure of a conventional liquid crystal display device mainly comprises: a case and mechanical and electronic components such as panel, backlight module, etc., installed inside the case. Referring to FIG. 1, a case mainly comprises two large parts, a front frame 1a and a back cover 2a cooperating with each other, a side wall of the back cover 2a is overlapped on an inner side of a side wall 11a of the front frame 1a, installation holes are disposed in the side walls of the front frame 1a and the back cover 2a, and an installation pole extended inwardly is disposed at the hole on the side wall of the back cover 2a; by a thread on the installation pole, a fastener 4a, such as a screw, etc., goes through a hole 111a in the side wall 11a of the front frame 1a and is fixed with the installation pole in the side wall of the back cover 2a, thus the fastener 4a is prevented from detaching; the fastener 4a acts as a forelock by going through the front frame 1a and the back cover 2a horizontally, so that the front frame 1a and the back cover 2a can be prevented from detaching from each other vertically, thus they can be fixed together securely. For the conventional case structure, because a length and a thickness of the fastener 4a (e.g. a screw) as well as a horizontally extended length of the installation pole in the side wall of the back cover 2a, a width of a frame of the liquid crystal display device is limited, which is unfavorable for the requirement of a narrow width of the frame of the liquid crystal display device. Furthermore, an assembling of the case is done from a side, which is unfavorable for viewing by factory workers, the assembling will become more difficult and thus an efficiency of assembling is affected. In view of the problems, the conventional case structure of a liquid crystal display device needs to be improved.

SUMMARY OF THE INVENTION

In order to tackle the abovementioned technical problems, the present invention provides a case structure of liquid crystal display device, by which a width of a frame of a liquid crystal display device can become narrower.

Technical solutions employed by the present invention to solve the abovementioned technical problems include: providing a case of liquid crystal display device, it comprises a front frame and a back cover cooperating with each other, and a fastener for assembling the front frame and the back cover together, side walls of the front frame and the back cover are overlapping with each other and holes are disposed in the side walls correspondingly, further comprising a connector member, the connector member includes a fixing portion closely fitted with a bottom wall of the back cover; a connecting portion closely fitted with the side wall of the front frame; a stopping portion inserted into the holes in the side walls of the front frame and the back cover correspondingly; an installation pole is disposed on the bottom wall of the back cover. The fixing portion of the connector member has an installation hole corresponding to the installation pole, and the fastener goes through the installation hole and is fastened in the installation pole, and thus the connector member is fixed.

The stopping portion and the holes in the side walls of the front frame and the back cover are interference fitted.

The holes in the side walls of the front frame and the back cover are rectangular.

The side wall of the front frame has a bent portion which is extended downwardly first and then inwardly, and a main body extended continuously downward from the bent portion, the hole is disposed in the main body.

The connecting portion of the connector member is laterally within a boundary limited by the side wall of the front frame.

A number of the connecting portion of the connector member is more than two, which are formed by extending upwardly and separately from a side edge of the fixing portion; a number of the stopping portion of the connector member is the same as a number of the connecting portion, and each of the stopping portions is formed by extending and bending inwardly from an upper end of the corresponding connecting portion.

The fixing portion of the connector member has at least two installation holes separated from each other.

The connector member is made of metal and is bent and formed by pressing. Or, the connector member is made of a high polymer material and is formed in one piece by injection molding.

Technical solutions employed by the present invention to solve the abovementioned technical problems further include: providing a liquid crystal display device comprising the abovementioned case.

Comparing with conventional techniques and according to a liquid crystal display device and its case of the present invention, by adding the connector member, an installation of the fastener is changed from a side to a bottom, which is in favor of reducing a width of a frame of the liquid crystal display device, and an efficiency of installation of the liquid crystal display device can also be enhanced.

DETAILED DESCRIPTION OF THE INVENTION

The present invention will become more fully understood by reference to the following detailed description thereof when read in conjunction with the attached drawings.

Figure 1:
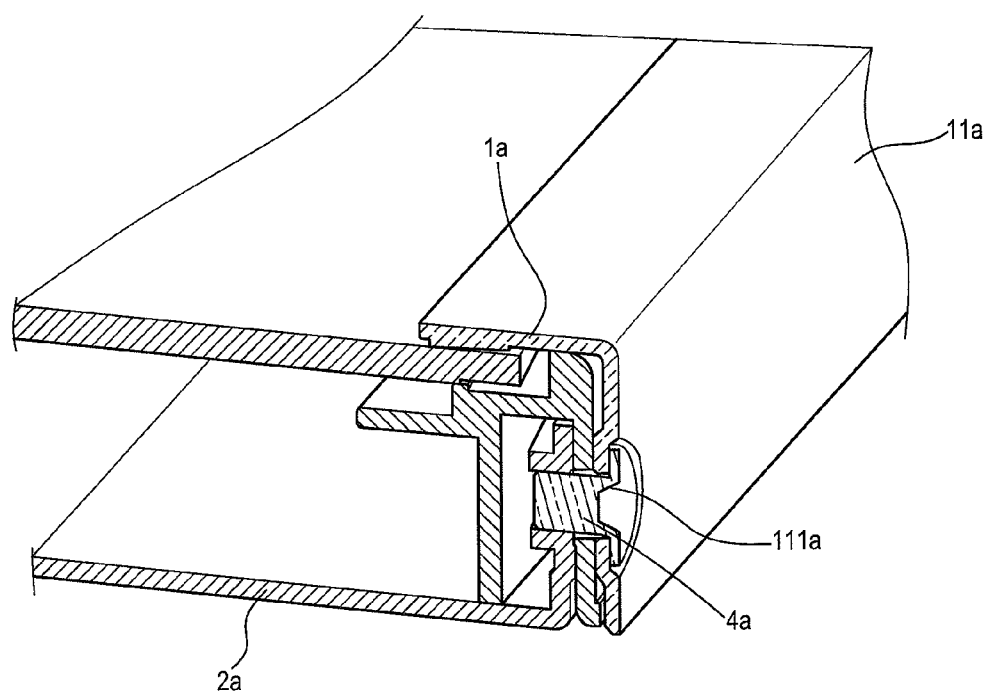
FIG. 1 is a perspective view of a conventional structure of a case of a liquid crystal display device.
Figure 2:
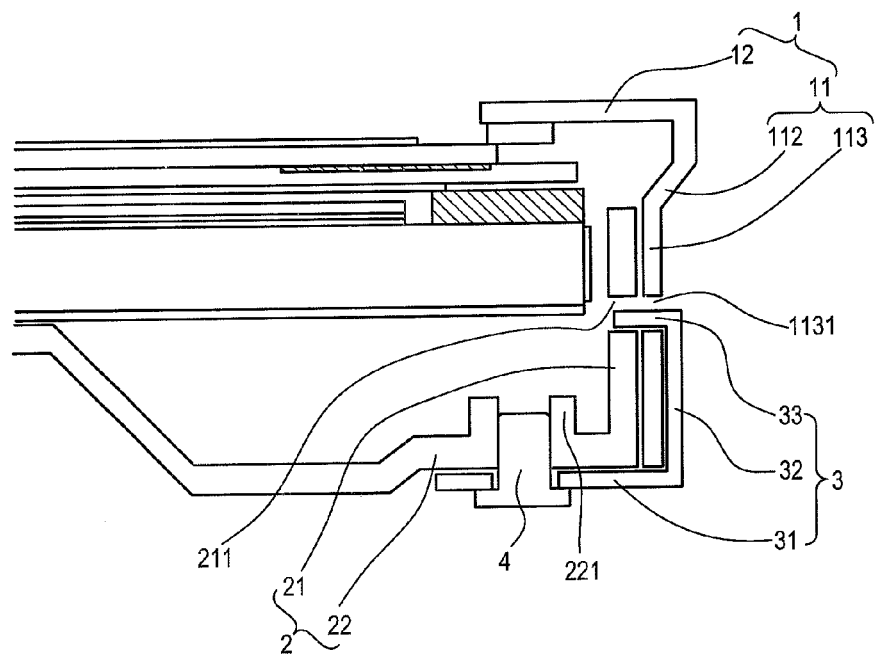
FIG. 2 is an illustration of a structure of a case of a liquid crystal display device according to the present invention.

Referring to FIG. 2, a case structure of a liquid crystal display device of the present invention mainly comprises: a front frame 1, a back cover 2, a connector member 3 and a fastener 4.

The front frame 1 can be formed by pressing and bending of metal sheet, metal plate, or metal bar, it includes a top wall 12 and a side wall 11. The side wall 11 has a bent portion 112 which is extended downwardly first and then inwardly, and a main body 113 extended continuously downward from the bent portion 112. A hole 1131 is disposed in the main body 113, preferably, the hole 1131 is rectangular.

The back cover 2 can be made of a high polymer material and is formed in one piece by injection molding, and it includes a bottom wall 22 and a side wall 21. An installation pole 221 is disposed on the bottom wall 22. A hole 211 is disposed in the side wall 21. When the back cover 2 and the front frame 1 are assembled together, the side wall 21 and the side wall 11 are overlapped with each other, a location of the hole 211 and a location of the hole 1131 of the front frame 1 are corresponded with each other.

The connector member 3 can be bent and formed by pressing of a metal plate, or it can be made of an organic high polymer material and can be formed in one piece by injection molding. The connector member 3 includes a fixing portion 31, a connecting portion 32 and a stopping portion 33.

An Installation hole 311 is disposed in the fixing portion 31. When the connector member 3, the front frame 1 and the back cover 2 are assembled together, the fixing portion 31 and the bottom wall 22 of the back cover 2 are closely fitted together, the connecting portion 32 and the main body 113 of the side wall 11 of the front frame 1 are closely fitted together, and the stopping portion 33 is inserted horizontally into the hole 1131 of the front frame 1 and the hole 211 of the back cover 2. Preferably, the stopping portion 33 and the hole 1131 as well as the hole 211 are interference fitted.

Such a structure can effectively prevent the back cover 2 and the front frame 1 from detaching from each other vertically, thus the front frame 1 and the back cover 2 can be fixed together securely. A fixation of the connector member 3 is relied on the installation hole 311 in the fixing portion 31, and its location and a location of the installation pole 221 on the back cover 2 are corresponded with each other. In addition, by employing the fastener 4, such as a screw, etc., the connector member 3 can be assembled on the back cover 2 securely.

Furthermore, because the side wall 11 of the front frame 1 is indented inwardly, when the connecting portion 32 and the main body 113 of the side wall 11 of the front frame 1 are fitted together, the connecting portion 32 is laterally within a boundary limited by the side wall 11, therefore a width of the case is not increased and a stylish appearance of the case is not affected.

Figure 3:
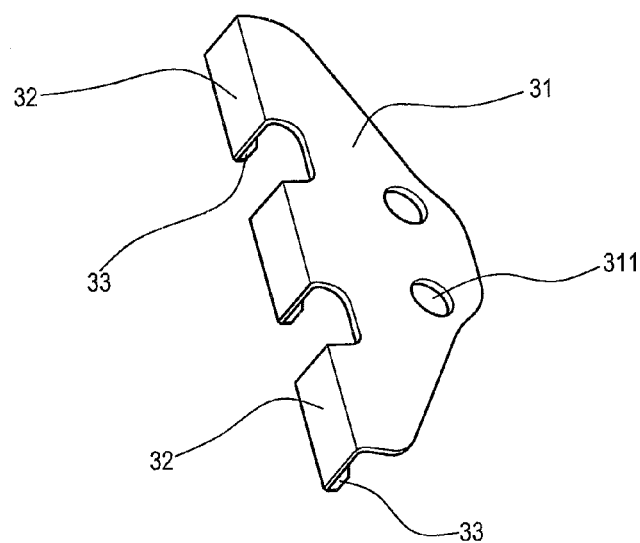
FIG. 3 is a perspective view of a structure of a connector member of the case structure of the liquid crystal display device according to an embodiment of the present invention.

Referring to FIG. 3, it shows an embodied structure of the connector member 3 which is formed by bending and pressing of a metal plate in one piece. The connector member 3 includes a fixing portion 31 which is roughly in a trapezium shape, and two of the installation holes 311 are disposed in the fixing portion 31; three of the connecting portions 32 are extended upwardly and separately from a side edge of the fixing portion 31; three of the stopping portions 33 are extended and bent inwardly in 90 degrees from an upper edge of each of the connecting portions 32 respectively. In corresponding to such a structure of the connector member 3, two of the installation poles 221 are formed on the bottom wall 22 of the back cover 2, three of the holes 211 are disposed in the side wall 21, and three of the holes 1131 are disposed in the main body 113 of the side wall 11 of the front frame 1.

It should be noted that, the connector member 3 shown in FIG. 3 is only illustrated as an example, the structure of the three connecting portions 32 and the three stopping portions 33 can be changed to two connecting portions 32 and two stopping portions 33 or one connecting portion 32 and one stopping portion 33; or, a number of the installation holes 311 can be changed from two to three or one, correspondingly, three installation poles 221 or one installation pole 221 can be formed on the bottom wall 22 of the back cover 2; or, other alternatives without requiring extra manpower can also be made which will not be mentioned herein.

During an assembling of the liquid crystal display device, the connector member 3 can be disposed according to actual requirements, for examples: disposing on two opposite sides of the case; disposing on three or four sides of the case; disposing of one or more than one on each side of the case.

Comparing with conventional techniques and according to the liquid crystal display device and its case of the present invention, by adding the connector member 3, an installation of the fastener 4 is changed from a side to a bottom, the width of the front frame 1 is not limited to be wider, which is in favor of reducing the width of the frame of the liquid crystal display device; furthermore, because the installation of the fastener 4 is changed from the side to the bottom, so that it is favorable for assembling and its difficulty is reduced, thus the efficiency of installation of the liquid crystal display device can be enhanced.

Note that the specifications relating to the above preferred embodiment should be construed as exemplary rather than as limitative of the present invention, with many variations and modifications of the description and the accompanying drawings disclosed above, for example, having the regularly arranged structure of the protruded portions 211 and the indented portions 212 of the uneven surface 21 replaced by irregularly arranged matte surfaces, are defined by the appended claims and their legal equivalents.

What is claimed is:

1. A case of liquid crystal display device, having a front frame and a back cover cooperating with each other and a fastener to assemble the front frame and the back cover together, side walls of the front frame and the back cover being overlapping with each other and holes being disposed in the side walls correspondingly, comprising:
   a connector member, the connector member including a fixing portion closely fitted with a bottom wall of the back cover;
   a connecting portion closely fitted with the side wall of the front frame; and
   a stopping portion inserted into the holes in the side walls of the front frame and the back cover correspondingly,
   wherein an installation pole being disposed on the bottom wall of the back cover, the fixing portion of the connector member having an installation hole corresponding to the installation pole, the fastener being gone through the installation hole and being fastened in the installation pole, and thus the connector member being fixed.

2. The case as claimed in claim 1, wherein the stopping portion and the holes in the side walls of the front frame and the back cover are interference fitted.

3. The case as claimed in claim 2, wherein the holes in the side walls of the front frame and the back cover are rectangular.

4. The case as claimed in claim 1, wherein the side wall of the front frame has a bent portion extended downwardly first and then inwardly and a main body extended continuously downward from the bent portion, the hole is disposed in the main body.

5. The case as claimed in claim 4, wherein the connecting portion of the connector member is laterally within a boundary limited by the side wall of the front frame.

6. The case as claimed in claim 1, wherein a number of the connecting portion of the connector member is more than two, formed by extending upwardly and separately from a side edge of the fixing portion; a number of the stopping portion of the connector member is equal to the number of the connecting portion, each of the stopping portions is formed by extending and bending inwardly from an upper end of the corresponding connecting portion.

7. The case as claimed in claim 1, wherein the fixing portion of the connector member has at least two installation holes separated from each other.

8. The case as claimed in claim 1, wherein the connector member is made of metal and is bent and formed by pressing.

9. The case as claimed in claim 1, wherein the connector member is made of a high polymer material and is formed in one piece by injection molding.

10. A liquid crystal display device, comprising: the case as claimed in claim 1.

11. The liquid crystal display device as claimed in claim 10, wherein the stopping portion and the holes in the side walls of the front frame and the back cover are interference fitted.

12. The liquid crystal display device as claimed in claim 11, wherein the holes in the side walls of the front frame and the back cover are rectangular.

13. The liquid crystal display device as claimed in claim 10, wherein the side wall of the front frame has a bent portion extended downwardly first and then inwardly and a main body extended continuously downward from the bent portion, the hole is disposed in the main body.

14. The liquid crystal display device as claimed in claim 13, wherein the connecting portion of the connector member is laterally within a boundary limited by the side wall of the front frame.

15. The liquid crystal display device as claimed in claim 10, wherein a number of the connecting portion of the connector member is more than two, formed by extending upwardly and separately from a side edge of the fixing portion; a number of the stopping portion of the connector member is equal to the number of the connecting portion, each of the stopping portions is formed by extending and bending inwardly from an upper end of the corresponding connecting portion.

16. The liquid crystal display device as claimed in claim 10, wherein the fixing portion of the connector member has at least two installation holes separated from each other.

17. The liquid crystal display device as claimed in claim 10, wherein the connector member is made of metal and is bent and formed by pressing.

18. The liquid crystal display device as claimed in claim 10, wherein the connector member is made of a high polymer material and is formed in one piece by injection molding.

* * * * *